(12) United States Patent
Zecchi et al.

(10) Patent No.: US 10,774,947 B2
(45) Date of Patent: Sep. 15, 2020

(54) DETECTING AND SIGNALING SYSTEM (71) Applicant: O.M.T. OFFICINA MECCANICA TARTARINI S.r.l., Castel Maggiore (Bologna) (IT)

(72) Inventors: Stefano Zecchi, Bologna (IT); Omero Borghesani, Centro (IT); Andrea Monti, Funo de Argelatio (IT)

(73) Assignee: O.M.T. OFFICINA MECCANICA TARTINI S.r.I., Castel Maggiore (Bologna) (IT)

( * ) Notice: Subject to any disclaimer, the term of this patent is extended or adjusted under 35 U.S.C. 154(b) by 0 days.

(21) Appl. No.: 16/072,798

(22) PCT Filed: Jan. 26, 2017

(86) PCT No.: PCT/IB2017/050412
§ 371 (c)(1),
(2) Date: Jul. 25, 2018

(87) PCT Pub. No.: WO2017/130129
PCT Pub. Date: Aug. 3, 2017

(65) Prior Publication Data
US 2019/0032814 A1    Jan. 31, 2019

(30) Foreign Application Priority Data

Jan. 27, 2016   (IT) .................. 102016000008150
Jan. 27, 2016   (IT) .................. 202016000008172 U (51) Int. Cl.
*F16K 37/00*   (2006.01)
*F16K 31/122*  (2006.01)
(Continued)

(52) U.S. Cl.
CPC .......... *F16K 37/0041* (2013.01); *F16K 1/123* (2013.01); *F16K 1/126* (2013.01);
(Continued)

(58) Field of Classification Search
CPC ...... F16K 1/123; F16K 1/126; F16K 31/1226; F16K 3/265; F16K 37/0041;
(Continued)

(56) References Cited

U.S. PATENT DOCUMENTS 2,773,251 A    12/1956  Snyder
4,211,935 A *   7/1980  Erben .................. H03K 17/965
                                                     200/81.4
(Continued)

FOREIGN PATENT DOCUMENTS

WO    WO-2015/140706 A1    9/2015

OTHER PUBLICATIONS

International Search Report and Written Opinion for PCT/IB2017/050412, dated May 22, 2017.

*Primary Examiner* — Atif H Chaudry
(74) *Attorney, Agent, or Firm* — Marshall, Gerstein & Borun LLP (57) ABSTRACT

Described is a system for remotely detecting and signalling the open and/or closed state of the shutter (O) of an element (3) for controlling the flow of gas along a gas distribution line (2), comprising an electric switch (17; 18) configured to generate an electrical signal representing at least one of the open and closed states.

21 Claims, 5 Drawing Sheets (51) Int. Cl.
*F16K 31/126* (2006.01)
*F16K 1/12* (2006.01)
*G01L 13/02* (2006.01)
*F16K 3/26* (2006.01)

(52) U.S. Cl.
CPC ............ *F16K 3/265* (2013.01); *F16K 31/122* (2013.01); *F16K 31/126* (2013.01); *F16K 31/1226* (2013.01); *F16K 37/0083* (2013.01); *G01L 13/025* (2013.01); *F16K 37/0033* (2013.01); *Y10T 137/3367* (2015.04); *Y10T 137/7834* (2015.04)

(58) Field of Classification Search
CPC ............. F16K 37/0033; F16K 37/0083; F16K 37/0025; F16K 37/0058; F16K 37/0008; F16K 37/0091; F16K 37/005; Y10T 137/8242; Y10T 137/8326; Y10T 137/8225; Y10T 137/3367; Y10T 137/7834; G01L 13/025
See application file for complete search history.

(56) References Cited

U.S. PATENT DOCUMENTS

| | | | |
|---|---|---|---|
| 6,189,563 B1 * | 2/2001 | Taylor | F16K 31/1245 137/487.5 |
| 2002/0029808 A1 * | 3/2002 | Friend | F16K 37/0091 137/551 |
| 2015/0320951 A1 * | 11/2015 | Acker | A61M 16/12 128/203.14 |

* cited by examiner

DETECTING AND SIGNALING SYSTEM

TECHNICAL FIELD

This invention relates to a detecting and signalling system.

More specifically, this invention relates to a system for remotely detecting and signalling the open and/or closed state of the shutter of an element for controlling the flow of gas along a gas distribution line.

BACKGROUND ART

In the field of gas distribution, there has always been a request from customers for position signalling devices to check, from a remote station, the open or closed status of apparatuses, such as the means for controlling the flow, which are located, for example, inside a gas regulating station.

In this description, the expression control elements is used to mean both devices for regulating the flow of gas and devices for safely blocking the flow of gas.

In other words, the expression flow control means is used to mean pressure regulating devices and also safety devices of both the analogue and on-off type.

The above-mentioned regulating stations are in fact spread throughout the territory and cannot be physically manned by an operator who continuously checks the correct operation.

Currently, this signalling is performed by switches which are directly connected to the mechanical detection of the position of the shutter of the control element.

A type of switch (proximity switch) detects when a metal mass approaches.

In other words, by directly associating the movement of a mechanical stroke indicator of the shutter of the element for controlling the flow to a metal plate which positions itself close to this switch, the latter emits a signal signifying the position of the stroke indicator and, therefore, the closed/open state of the control element.

To all intents and purposes, it is a proximity sensor.

Another type of switch (microswitch) comprises the physical activation of a pushbutton which, also activated by the above-mentioned plate integral with the above-mentioned stroke indicator, signals one situation or the other.

In other words, in both these prior art solutions a mechanical connection is currently made between the element for controlling the flow and the switch.

Thus, in both these solutions, a rod or similar metal part protrudes from the body of the control element, connected directly and mechanically to the body of the control element (pressure regulating valve or block valve) for detecting a posteriori the state of the shutter.

The creation of this mechanical connection allows a detection a posteriori of the effect requested by the variation or fault of the parameter controlled (pressure downstream of the station) and only in the case of correct operation of the shutter of the control element.

Moreover, in practical cases, the creation of this mechanical connection implies the drawback of having to make a series of variants as a function of both the shape and size of the control element and the space available in the surrounding environment.

In short, it is necessary to customise the connection between the switch and the control element for each specific situation, using suitable and special mechanical solutions, such as brackets plates, rods etc.

Moreover, since the prior art systems are positioned outside the control element, even if they are not necessarily exposed to the adverse weather conditions of the outside environment, they are nevertheless exposed to environmental conditions which are not always necessarily favourable (for example, formation of condensate which facilitates rusting).

Moreover, the fact that the above-mentioned switch is any case powered electrically, and rigidly connected to the body of the control element, implies the further drawback that the control element complete with integral switch is classified as an assembly and must therefore be internationally compliant with legally binding and without doubt stricter safety regulations.

Further, the normal signalling systems are based on the stroke of the shutter element of the control element to indicate whether the element is operating or not. Sometimes, however, the stroke of the shutter (to enter regulating mode) is so small, even in the range of a few tenths of a millimeter, that its measurement by a mechanical detector may be completely imprecise or even not detected, if the above-mentioned movement is less than the sensitivity of the detector.

Disclosure of the Invention

The aim of the invention is therefore to provide a detecting and signalling system which is free of the drawbacks and limitations of the prior art solutions.

A further aim of this invention is to provide a detecting and signalling system which is simple and inexpensive to implement and practical to use. The technical features of the invention according to the above-mentioned objects may be easily inferred from the contents of the appended claims, especially claims 1 and 8, and, preferably, any of the claims that depend, either directly or indirectly, on these claims.

BRIEF DESCRIPTION OF THE DRAWINGS

The advantages of the invention will become more apparent from the detailed description which follows, with reference to the accompanying drawings which illustrate preferred embodiments of the invention provided merely by way of example without restricting the scope of the inventive concept, and in which.

DETAILED DESCRIPTION OF PREFERRED EMBODIMENTS OF THE INVENTION

Figure 1:
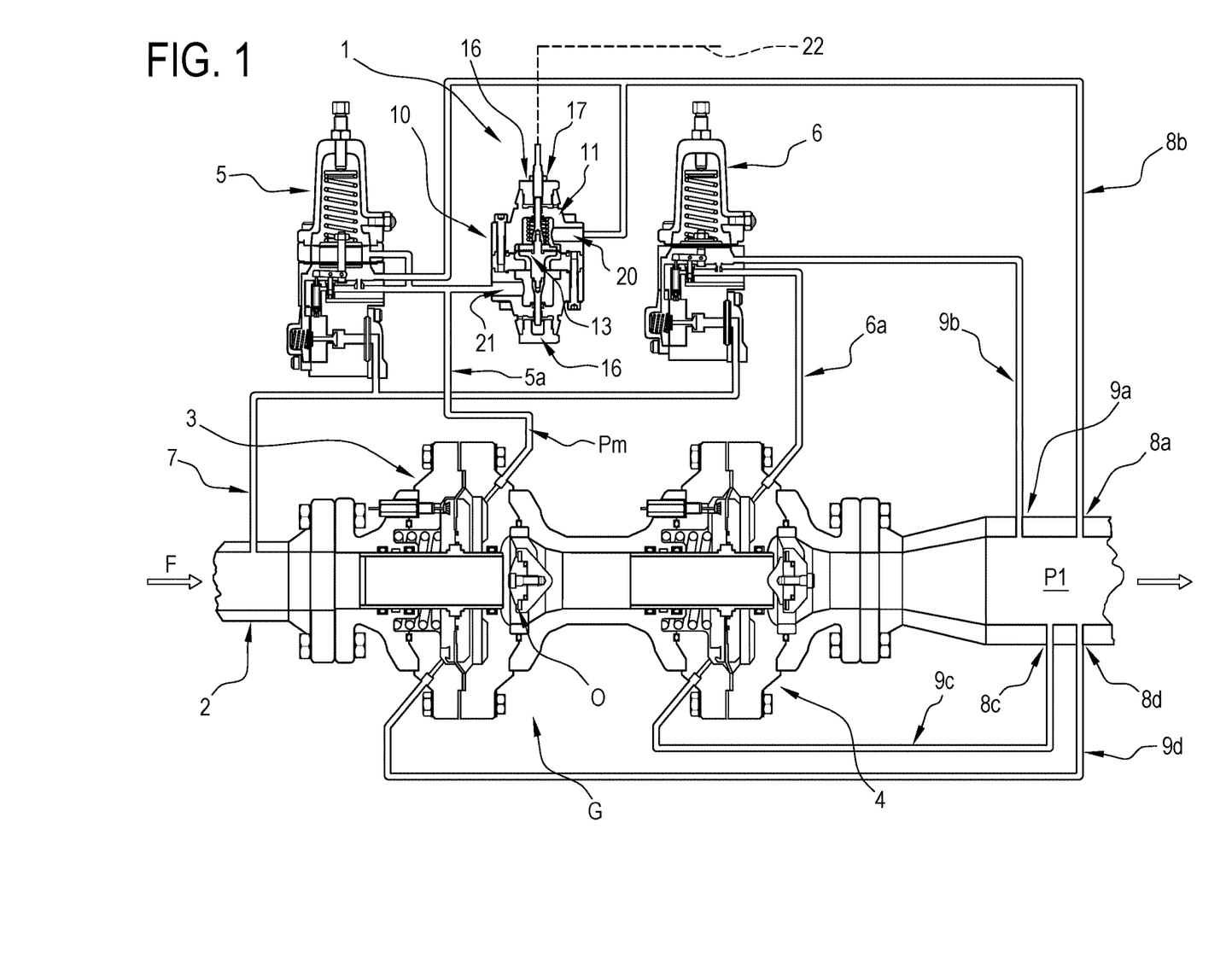
FIG. 1 is a schematic view, with some parts in cross section for clarity, of a first embodiment of the system according to this invention integrated in a gas distribution line.

As illustrated in FIG. 1, the reference numeral 1 denotes in its entirety a first embodiment of the detecting and signalling system made according to this invention.

The detecting and signalling system 1, hereinafter denoted for brevity also merely as system 1, is inserted in a unit G for regulating the gas along a stretch of a line 2 for distributing gas, for example natural gas.

The arrow F indicates the direction of travel of the gas along line.

With reference to the line 2, along the section illustrated there are, one after the other, two elements 3, 4 for controlling the flow of gas. They are pressure regulating devices of substantially known type.

The regulating device 3 positioned upstream, relative to the above-mentioned direction of travel, is a standby and safety device, whilst the regulating device 4 positioned downstream is the one normally operating, which therefore regulated the pressure of the gas passing through it.

These control elements 3, 4 positioned upstream and downstream are denoted below, respectively, also as standby regulator 3 and main regulator 4.

For each standby and main regulator 3, 4 there is a respective control element 5, 6.

The control elements 5, 6 are of substantially known type and are actuated pneumatically using the difference in pressure of the gas between upstream and downstream of the pressure regulators 3, 4.

Each control element 5, 6 is connected to the respective adjusting device 3, 4 by a respective drive conduit 5a, 6a.

Inside the drive conduits 5a, 6a, when used, a respective drive pressure Pm is established, determined by the respective control element 5, 6 and designed to act on the pressure regulator 3, 4 of the modulating the operation.

The line 2 also comprises a conduit 7 for driving the control elements 5, 6. On the line 2, downstream of the main regulator 4, there are a multitude of points 8a, 8b, 8c, 8d for picking up the pressure regulated downstream.

From these points 8a, 8b, 8c, 8d extend a plurality of pipes 9a, 9b, 9c, 9d designed to transmit the pressure measured value P1 to the various devices present in the regulating unit G on the line 1.

In particular, both the control elements 5, 6 and the standby and main regulating devices 3, 4 need, in known manner, for their correct operation, to receive a signal representing the pressure value P1 of the gas downstream of the main regulating device 4.

A way to transmit this value is that of placing directly in communication each of the above-mentioned regulating devices and control elements with the gas on the respective line, downstream of the main regulating device 4.

As illustrated in FIG. 1, the detecting and signalling system 1 comprises a pneumatic detecting device 10.

Figure 2:
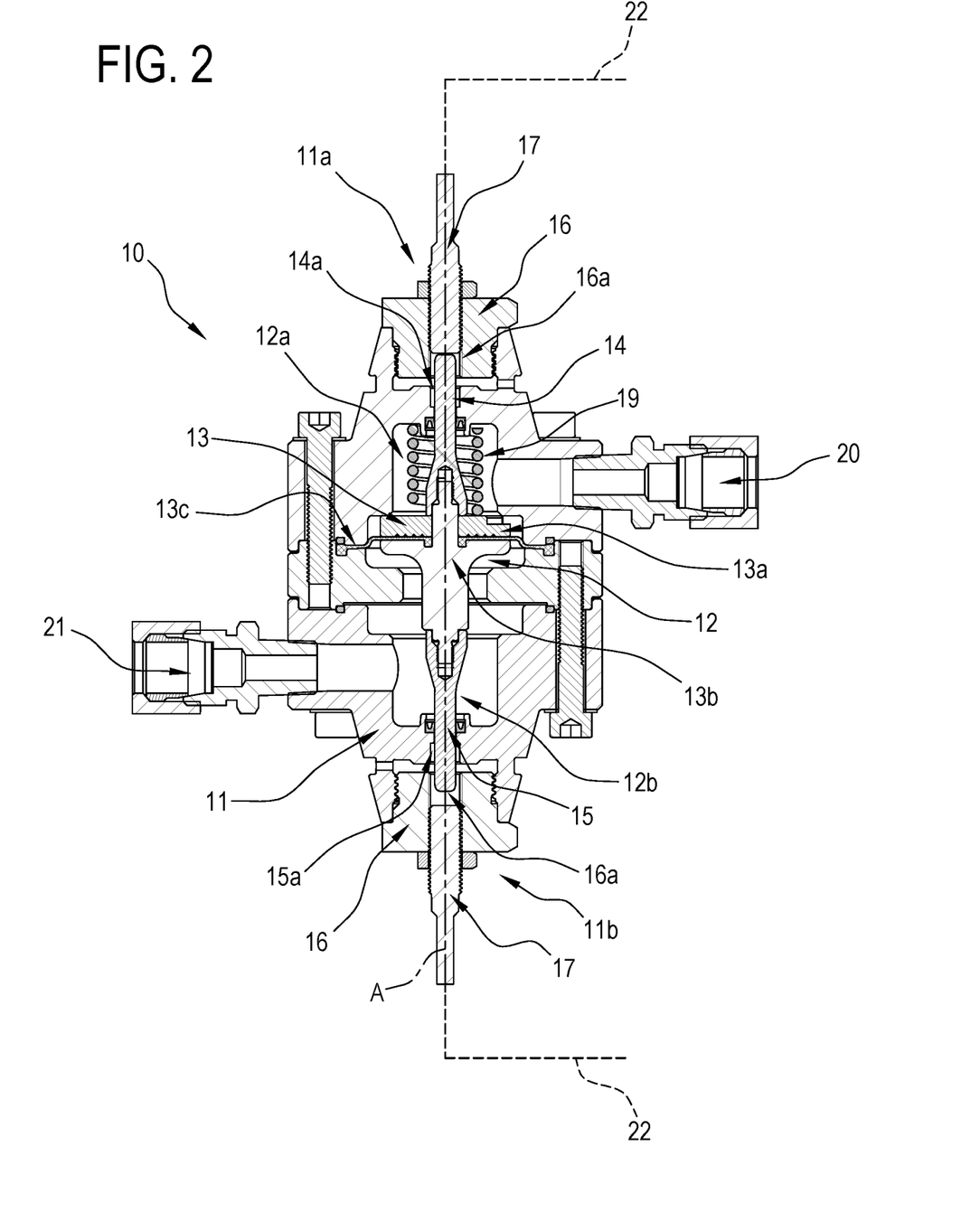
FIG. 2 is a cross section view of a detail of a first embodiment of the system of FIG. 1.
Figures 3, 4:
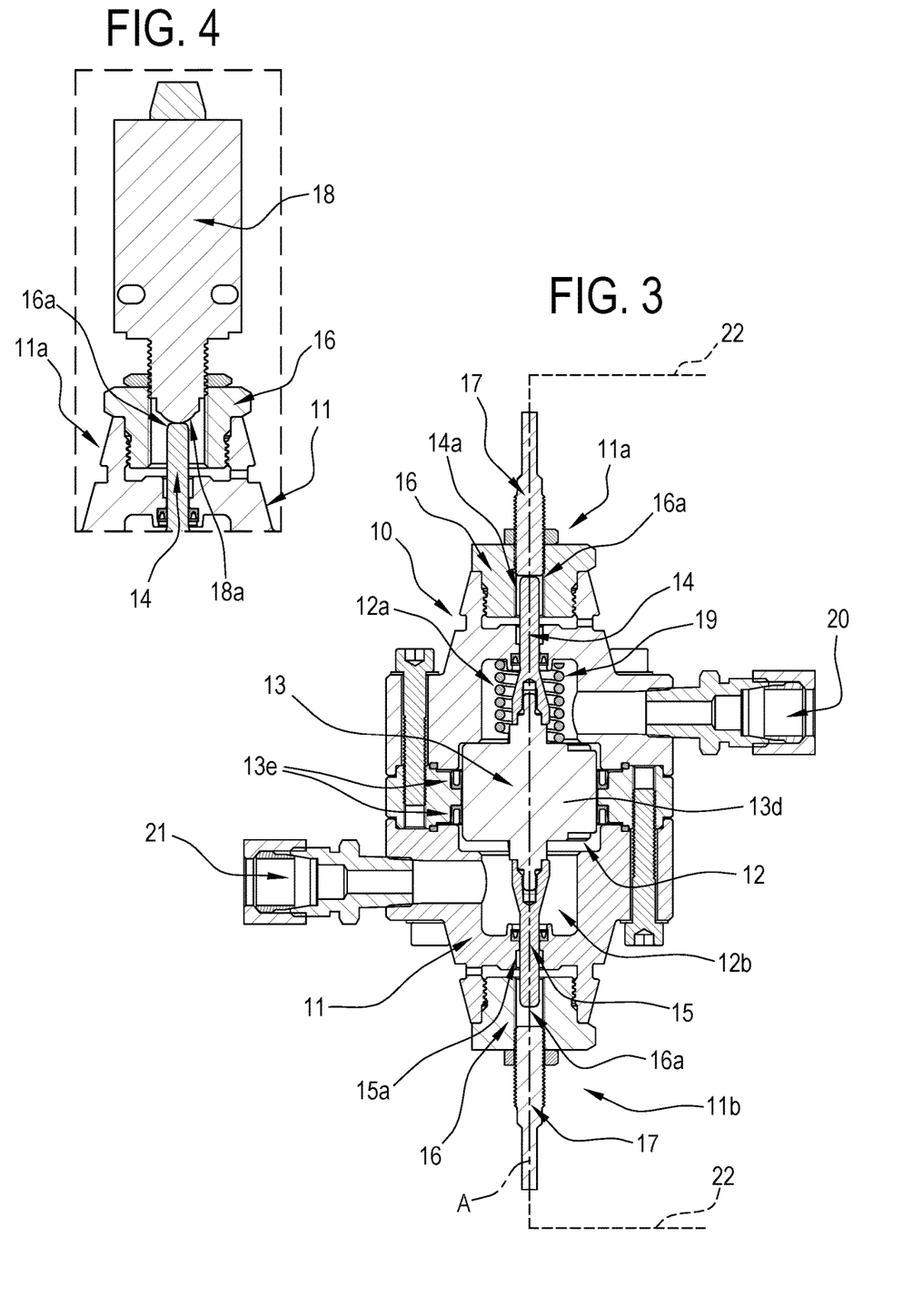
FIG. 3 is a cross section view of a variant embodiment of the detail of FIG. 2.
FIG. 4 is a cross section view of a variant embodiment of a component of the details of FIGS. 2 and 3.

As shown more clearly in FIGS. 2 and 3, the pneumatic detecting device 10 comprises an outer containment casing 11 inside of which is defined a chamber 12.

The chamber 12 slidably houses a movable body 13.

The movable element 13 slides longitudinally along a direction coinciding with a central axis A of the outer casing 11.

The movable body 13 has an axial symmetrical extension.

The movable body 13 is configured to divide the chamber 12 into two sub-chambers 12a, 12b respectively upper and lower.

FIGS. 2 and 3 illustrate in detail two variant embodiments of the pneumatic detecting device 10.

According to the embodiment illustrated in FIG. 2 (and also in FIG. 1), the movable body 13 consists of two flanges 13a, 13b between which is clamped a deformable membrane 13c.

In the embodiment illustrated in FIG. 3, the movable body 13 comprises a piston 13d, isolated from the inner wall of the chamber 12 by means of two ring seals 13e.

The movable body 13, in both its embodiments illustrated in FIGS. 2 and 3, has two axial projection 14, 15, respectively upper and lower.

The two upper and lower projections 14, 15 project, respectively, in the upper sub-chamber 12a and in the lower sub-chamber 12b and protrude from them through respective calibrated holes 14a, 15a.

Respective caps 16 are fitted at the upper and lower ends 11a, 11 b of the outer casing 11.

The caps 16 are advantageously threaded and screwed to the ends 11a, 11b.

In the preferred embodiments illustrated of the pneumatic detecting device 10, each cap 16 has a respective central through hole 16a.

As illustrated in FIGS. 2 and 3, the detecting and signalling system 1 comprises two electric switches 17 of the proximity type supported by the above-mentioned pneumatic detecting device 10 and configured to each generate a respective electrical signal representing an open and closed status of the shutter O of a gas control element 3, 4.

The above-mentioned electric proximity switches 17 are partly housed in an outer portion of the above-mentioned hole 16a formed in the cap 16.

The electric switches 17 are screwed into the above-mentioned holes 16a. More specifically, the electric proximity switches 17 are designed to generate respective signals when the upper and lower projections 14, 15 of the movable body 13 move towards them.

FIG. 4 illustrates a different electric switch 18, of the type also referred to as microswitch, wherein a pushbutton 18 is physically activated by contact with a respective projection 14 of the movable body 13.

The electric switch 18 equipped with pushbutton 18 is alternative to the electric proximity switch 17.

With reference to the limit positions of the movable body 13, they define to all intents and purposes conditioning positions of the electric switch 17, 18 at which, that is to say, the switches 17, 18 generate the electrical signals.

A helical spring 19 opposing the movement of the movable body 13 is positioned inside the upper sub-chamber 12a and positioned around the upper projection 14 of the movable body 13.

The detecting and signalling system 1 comprises a first pneumatic conduit 20, partly defined by the pipe 8a, designed to connect the regulating device 10 to the gas distribution line 2, downstream of the control element 3, and a second pneumatic conduit 21, partly defined by the drive conduit 5a of the standby regulator 3, designed to connect the detecting device 10 to the element 3 for controlling the gas of the shutter for which the status is to be signalled.

As is also evident from what is described above, the pressure P1 is established in the first pneumatic conduit 20 whilst the drive pressure Pm exists in the second pneumatic conduit 21.

As illustrated in the accompanying drawings, the upper sub-chamber 12a is in fluid communication with the first pneumatic conduit 20 whilst the lower sub-chamber 12b is in fluid communication with the second pneumatic conduit 21.

The detecting device 10 is therefore a differential type device, that is to say, subjected to two pressure values.

In use, the pneumatic detector 10 is configured in such a way that the relative movable body 13 adopts the above-mentioned limit conditioning positions of the electric switches 17, 18, at least in the passage from a condition of inequality of the value P1, Pm of pressure of the gas in the above-mentioned first and second conduits 20, 21 to a condition of equality between the values P1, Pm of pressure of the gas in the first or second conduits 20, 21 or vice versa.

In reality, in the embodiments illustrated in FIGS. 2 and 3, in view of the presence of two electric switches 17, one of them is normally active and the other will only become active following the above-mentioned modification of the pressure downstream of the control element 3.

The embodiment of the pneumatic detecting device 10 illustrated in FIG. 1, on the other hand, has a single electric switch 17 which is therefore is designed to indicate only the opening or closing of the shutter of the control element 3 and not both conditions.

According to this variant, therefore, the single electric switch 17 can be either normally switched ON or normally switched OFF and then modify its condition following changes in pressure conditions.

In short, with reference to the system diagram illustrated in FIG. 1, which comprises a safety regulator 3 (or monitor) and a main regulator 4, the detecting and signalling device 10 is activated when the regulator 3 passes from the open condition (that is, substantially inactive, that is to say, with shutter O open) to a regulating condition (that is to say, with shutter O partly closed), due to a malfunction of the main regulator 4.

In other words, if the main regulator 4 stops operating (that is, stops regulating the pressure) then the intervention of the standby regulator 3 (monitor) is requested by the variation of the drive pressure supplied by the control element and, therefore, the regulator 3 receives sufficient energy to close the flow of gas, assuming correct operation of the shutter O of the control element (standby regulator 3).

The pressure difference on the line 2 between upstream and downstream of the shutter O of the standby regulator 3 is reproduced firstly upstream and downstream of the pneumatic detecting device 10 which is therefore activated and by means of the electric switch 17 signals the entering into operation of the standby regulator 3.

More in detail, the increase of the pressure upstream of the shutter O of the standby regulator 3, through the first pneumatic conduit 20 (drive conduit 5a), is reproduced in the lower sub-chamber 12b therefore producing a movement of the movable body 13 downwards and the simultaneous conditioning of the switch 17 which, therefore, generates a respective electrical signal.

In this situation, therefore, the system 1 detects the condition of entering into operation of the standby regulator 3, generates a simultaneous electrical signal and transmits it by an electric cable 22 to any remote station.

The cable 22 defines, for the system 1, respective means for remotely transmitting the electrical signal.

Figure 5:
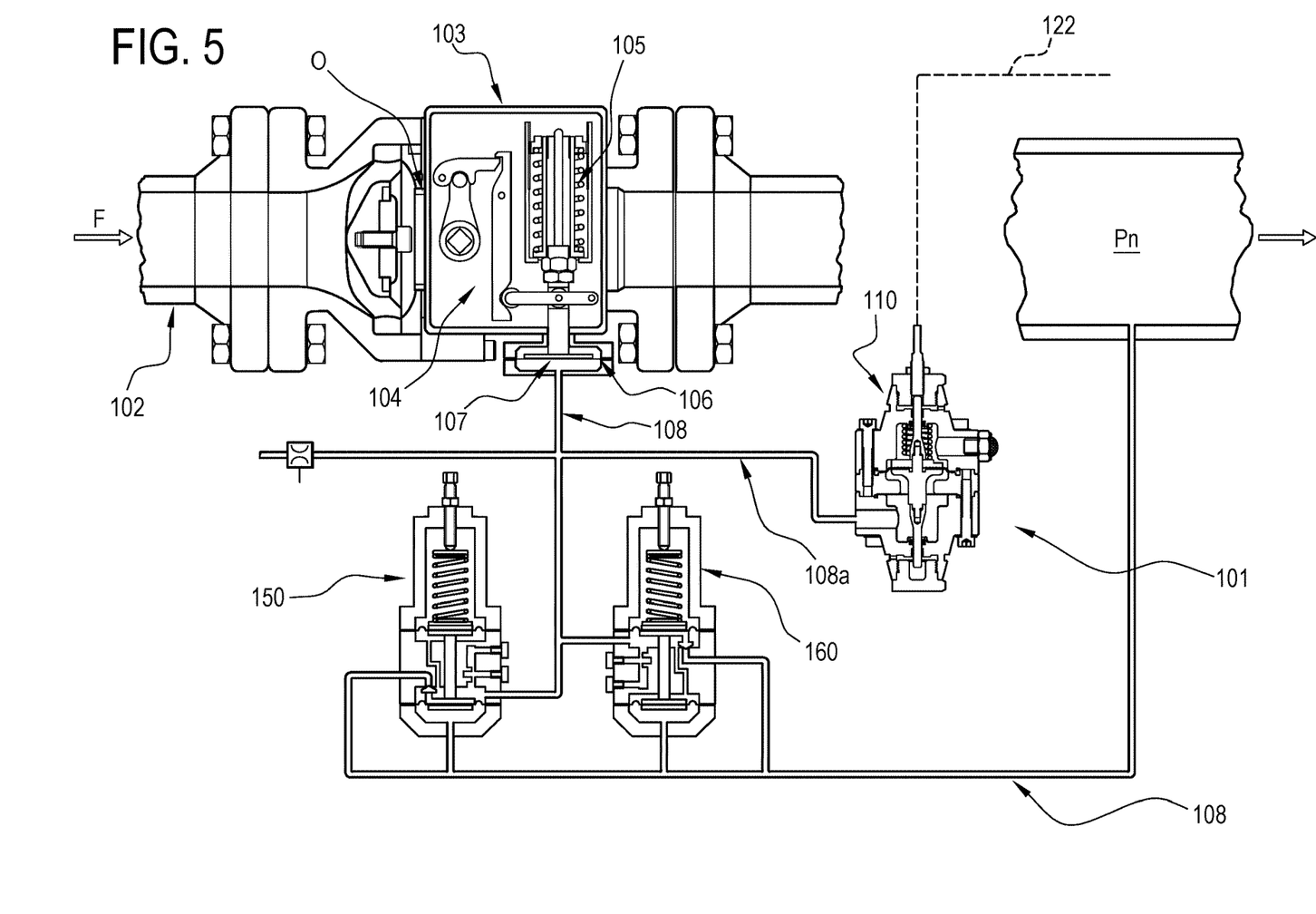
FIG. 5 is a schematic view, with some parts in cross section for clarity, of a second embodiment of the system according to this invention integrated in a gas distribution line.

As illustrated in FIG. 5, the reference numeral 101 denotes in its entirety a second embodiment of the detecting and signalling system according to this invention.

The detecting and signalling system 101, hereinafter denoted for brevity also merely as system 101, is positioned along a stretch of a line 102 for distributing gas, for example natural gas.

The arrow F indicates the direction of travel of the gas along line 102.

With reference to the line 102, along the section illustrated there is a safety device 103.

More specifically, by way of an example, FIG. 5 illustrates an element 103 for blocking the flow of gas along the line 102.

The block valve 103, during normal operation, is open and its intervention is only planned in certain circumstances, such as, for example, dangerous or potentially dangerous situations.

In this description, with reference to the valve 103 illustrated schematically in FIG. 5, the expressions safety device and block valve will be used indifferently, without in any way limiting the scope of the invention.

More in detail, the block valve 103 comprises a shutter O, shown only partly in FIG. 5, since it is shown in the retracted configuration, the shutter O being designed to move between two limit positions for, respectively, opening and closing the flow of gas.

The element 103, of substantially known type, has a mechanism 104 for driving the shutter, the mechanism 4 comprising a plurality of linkages.

The linkages, schematically illustrated in FIG. 5, contribute to defining, together with a spring 105, a position of stable equilibrium at which the shutter O is maintained in the open configuration.

The drive mechanism 104 is also connected to a pneumatic baffle 106 facing into a chamber 107 wherein there is normally a predetermined pressure value, for example atmospheric pressure (patm), which is significantly less than the regulated pressure value of the gas normally flowing along the line 102.

By using the pneumatic conduit 108, leading into the chamber 107, it is possible to place the chamber 107 at a pressure greater than atmospheric pressure, thereby destabilising the drive mechanism 104 which, abandoning its position of equilibrium in an open configuration, causes the immediate closing of the shutter O, in the manner described below.

The system 101 advantageously comprises two control elements 150, 160.

The control element 150, 160, known in the trade also as "control" or "release element", is of a substantially known type.

In the embodiment used in the system illustrated in FIG. 5, each control element 150, 160 is actuated pneumatically using the difference between the pressure pn of the gas downstream of the block valve 103 and respective values of calibration of the control elements 150, 160.

In other words, with reference, for example, to the control element 150, which can be defined as a minimum pressure element, it has a calibration value such as to intervene on the block valve 103 when the pressure value pn drops below a predetermined value pmin.

This circumstance might, for example, occur in the case of a significant loss of gas in the line 102, an event wherein the block of the line would be without doubt opportune.

Similarly, with reference to the control element 160, which can be defined as a maximum pressure element, it has a calibration value such as to intervene on the block valve 103 when the pressure pn exceeds a predetermined upper threshold value pmax.

This circumstance might, for example, occur in the case of a malfunction of the pressure regulating devices present along the line 102, which is also an event wherein the block of the line 102 would be without doubt opportune, to prevent a flow of gas with too high a pressure reaching users which are not set up for this.

In short, the operation of both the control elements 150, 160 is the same: if one of the following conditions occurs on the line 102 downstream of the safety valve 103:

$$pn > pmax$$

$$pn < pmin$$

using the pneumatic conduit 108, they change the chamber 107 to the pressure pn, that is to say, in substantial communication with the line 102 downstream of the safety valve 103.

Since the pressure value pn is without doubt greater than the value patm normally inside the chamber 107, this circumstance causes the immediate activation of the drive mechanism 104 and the simultaneous closing of the shutter O of the block valve 103.

After that, the flow of gas downstream of the valve 103 is interrupted, therefore placing the line 102 in safe conditions.

As illustrated in FIG. 5, the detecting and signalling system 101 comprises a pneumatic detecting device 110.

Figure 6:
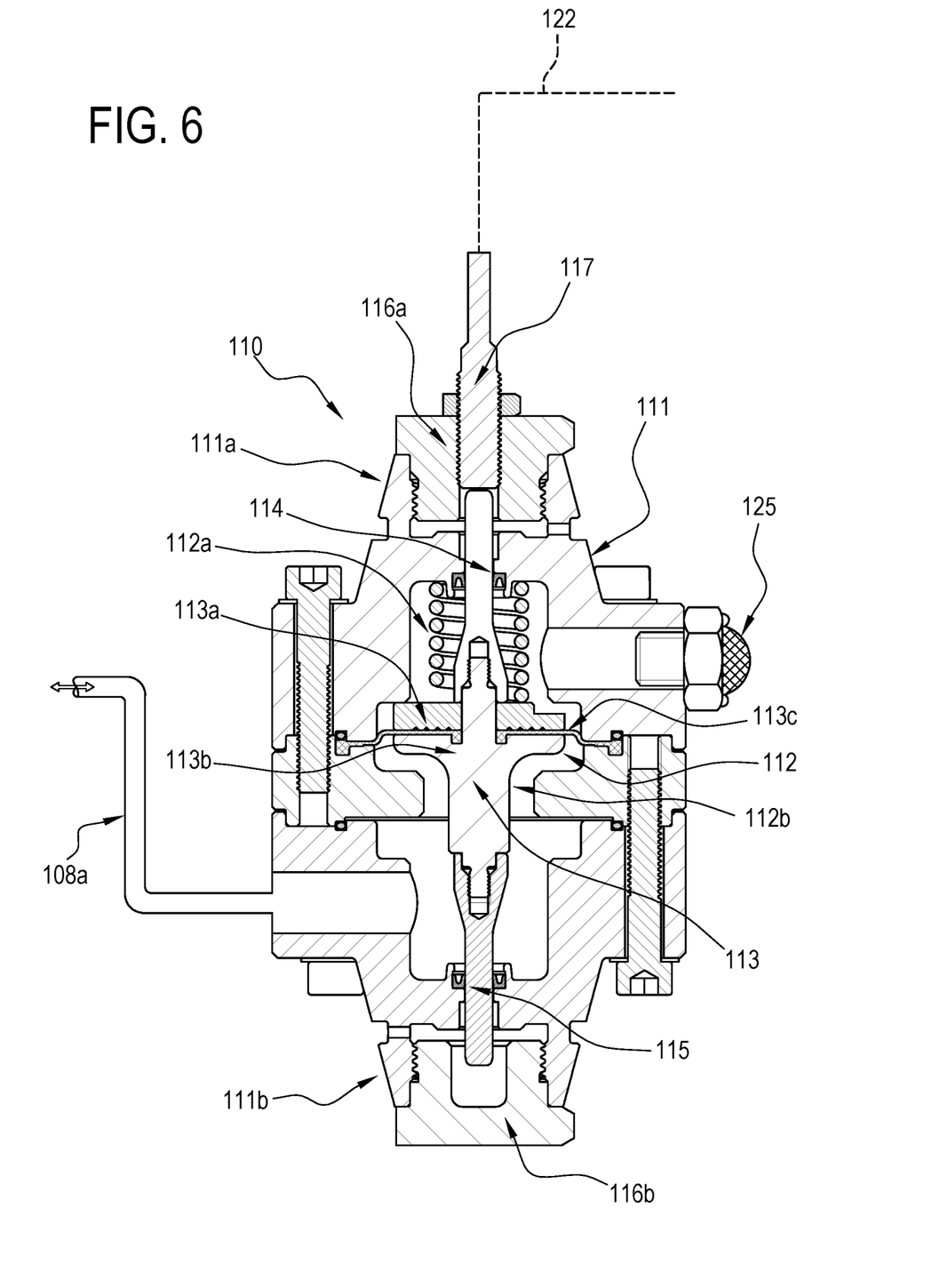
FIG. 6 shows a scaled-up view, in order to better illustrate the components, of a detail of the system of FIG. 5.

As shown more clearly in FIG. 6, the pneumatic detecting device 110 comprises an outer containment casing 111 inside of which is defined a chamber 112.

The chamber 112 slidably houses a movable body 113.

The movable element 113 slides longitudinally along a direction coinciding with a central axis of the outer casing 111.

The movable body 113 has an axial symmetrical extension.

The movable body 113 is configured to divide the chamber 112 into two sub-chambers 112a, 112b respectively upper and lower.

According to the preferred embodiment illustrated in FIG. 6, the movable body 113 consists of two flanges 113a, 113b between which is clamped a deformable membrane 113c.

The movable body 113, has two axial projections 114, 115, respectively upper and lower.

The two upper and lower projections 114, 115 project, respectively, in the upper sub-chamber 112a and in the lower sub-chamber 112b and protrude from them through respective calibrated holes.

The upper sub-chamber 112a is in fluid contact with the outside environment (at atmospheric pressure) through a filter cap 125.

Respective caps 116a, 116b are fitted at the upper and lower ends 111a, 111b of the outer casing 111.

The caps 116a, 116b are advantageously threaded and screwed to the ends 111a, 111b.

In the embodiment of the pneumatic detecting device 110 illustrated in FIG. 6, the upper cap 116a has a respective central through hole.

As illustrated in FIGS. 5 and 6, the detecting and signalling system 101 comprises an electric switch 117 of the proximity type supported by the above-mentioned pneumatic detecting device 110 and configured to generate a respective electrical signal representing an open or closed status of the shutter O of the safety valve 103.

FIGS. 5, 6 refer to a configuration of the device 110 wherein the switch 117 signals advantageously the closed condition of the shutter O. Variant embodiments, not illustrated, of the device 110 comprise a second electric switch positioned close to the lower end 111b of the casing 111, configured to generate a respective electrical signal representing an open status of the shutter O.

With reference to FIG. 6, the above-mentioned electric proximity switch 117 is partly housed in an outer portion of the hole formed in the cap 116a. More specifically, the electric proximity switch 117 is designed to generate an electric signal when it moves towards the projection 114 of the movable body 113.

In short, with reference to what is described above, upon the intervention of the safety valve 103, the pneumatic detecting device 110 is also activated, which, therefore, by means of the electric switch 117, signals the entering into operation of the valve 103.

By means of a relative stretch 108a, the conduit 108 is in effect connected to the pneumatic detecting device 110.

More in detail, the increasing or decreasing of the pressure along the line 102 beyond predetermined reference values is reproduced in the conduit 108 producing, therefore, a movement of the movable body 113 upwards and the simultaneous conditioning of the switch 117 which, therefore, generates a relative electrical signal.

In this situation, therefore, the system 101 detects the condition of entering into operation of the safety valve 103, generates a simultaneous electrical signal and transmits it by an electric cable 122 to any remote station.

The cable 122 defines, for the system 1, respective means for remotely transmitting the electrical signal.

In short, with reference to what is described above, the pneumatic detecting device 110 is activated by the variation of the signal by the control elements 150, 160 in parallel with the drive mechanism 104 for actuating the shutter 103 upon the intervention of the block valve, and, therefore, using the electric switch 117, the device 110 signals in a predictive manner the consequent effect expected by the block valve 103.

According to a variant embodiment, not illustrated, of the device 110, the above-mentioned movable body consists of a piston.

Also according to the variant embodiments, not illustrated, of the device 110, the above-mentioned electric switch is a microswitch configured to be controlled by contact by one of the projections 114, 115 of the movable body 113, to cause the generation of the electrical signal.

Further alternative embodiments, not illustrated, of the systems 10, 110 according to this invention comprise, as the pneumatic detecting device, a differential pressure gauge (or a pressure switch) acting on a respective electric switch to signal the reaching of determined preset pressure values by generating a suitable electrical signal.

The invention brings important advantages.

A first advantage is that, unlike existing systems, the system 1, 101 is able to supply a signal on the cause which requires the intervention of the control element and not on the consequent effect (closing of the shutter); therefore, the system 1, 101 is able to allow from a remote position the direct comparison between variation of the controlled parameter (downstream pressure) and effect requested from the control element. If there are operating faults in the shutter O of the control element, this comparison makes it possible to remotely detect the malfunction of the control element (regulating device or block valve).

Moreover, since the detecting device according to the invention is a pneumatic device with differential operation, it detects the cause (drive energy) which must lead to the actuation of the control element and not the effect which the actuation of the control element has had on controlled parameter (downstream pressure).

A further advantage is without doubt given by the fact that it is no longer necessary to customise prior art systems, since, by using the system 1, 101 according to the invention, it is no longer necessary to create brackets or specific elements for connecting the switch which are specific for each pressure regulator but it is only necessary, in the case of system 1, to connect the two inputs of the detecting device 10, respectively at drive pressure Pm and at pressure P1 downstream of the regulator or, in the case of system 101, to connect the input of the connecting device 110 to the pneumatic drive conduit 108 of the safety valve 103.

In this regard, there are pressurised outlets in every line downstream of the regulator.

Moreover, since the detecting device according to the invention is a pneumatic device with differential operation, it does not detect, in the case of system 1, the particular pressure existing in a line but simply the pressure difference between the drive and downstream of the pressure regulator; similarly, in the case of the system 101, it does not detect the particular pressure existing in a line but simply the fact that in the drive conduit 108 of the valve safety 103 a pressure is established which is higher than atmospheric pressure.

This means that it is not even necessary to carry out calibrations or selections based on the absolute pressure values of the lines, since a single detecting device is suitable for a multitude of different gas distribution lines.

A further advantage of the system according to the invention is due to the possibility of locating the pneumatic detecting device physically displaced from the relative element for controlling the gas, so as to prevent the need for specific electrical connections and certification requirements.

The invention claimed is:

1. A system for remotely detecting and signaling the open and/or closed state of a shutter of a control element for controlling the flow of gas along a gas distribution line, comprising:
    first and second electric switches configured to generate first and second electrical signals representing, respectively, the open and closed states of the shutter of the control element,
    a pneumatic detecting device supporting the first and second electric switches and comprising a body which is movable inside the pneumatic detecting device, the body designed to reach an end conditioning position of the first electric switch at which the first electric switch generates the first electrical signal, and the body further designed to reach an end conditioning position of the second electric switch at which the second electric switch generates the second electrical signal,
    means for remotely transmitting the first and second electrical signals,
    an element for controlling the control element, and
    pneumatic connection means configured for connecting the pneumatic detecting device at least to the control element.

2. The system according to claim 1, wherein the pneumatic connecting means comprises:
    a first pneumatic conduit designed to connect the pneumatic detecting device to the distribution line, downstream of the control element, at a first operating pressure, and
    a second pneumatic conduit designed to connect the pneumatic detecting device to a drive conduit of the control element, wherein a drive pressure exists in the second conduit, the pneumatic detecting device being of the differential type and configured to cause the body to adopt the end conditioning position of the first electric switch or the second electric switch in the passage from a condition of inequality between the pressure values of the gas in the first and second pneumatic conduits to a condition of equality between the pressure values of the gas in the first and second pneumatic conduits, or vice versa,
    wherein the drive conduit departs from the control element.

3. The system according to claim 2, wherein the pneumatic detecting device comprises a chamber, the body is movable inside the chamber, and the body is configured to divide the chamber into two sub-chambers, one of the sub-chambers being in fluid communication with the first pneumatic conduit and the other of the sub-chambers being in fluid connection with the second pneumatic conduit or with the outside environment.

4. The system according to claim 1, wherein the pneumatic connecting means comprises:
    a pneumatic conduit designed to directly or indirectly connect the control element to the distribution line, the pneumatic conduit also being in communication with the pneumatic detecting device; the pneumatic detecting device being configured such that the body adopts the end conditioning position of the first electric switch upon reaching the open state of the shutter and the body adopts the end conditioning position of the second electric switch upon reaching the closed state of the shutter.

5. The system according to claim 4, wherein the pneumatic detecting device comprises a chamber, the body is movable inside the chamber, and the body is configured to divide the chamber into two sub-chambers, one of the sub-chambers being in fluid communication with the pneumatic conduit and the other of the sub-chambers being in fluid connection with the outside environment.

6. The system according to claim 1, wherein the body is a piston.

7. The system according to claim 1, wherein the body comprises a deformable membrane.

8. The system according to claim 1, wherein the first electric switch is a proximity switch, and the body has a projection designed to move close to the first electric switch to cause the generation of the first electrical signal.

9. The system according to claim 1, wherein the first electric switch is a microswitch configured to be controlled by contact, and the body has a projection designed to contact the microswitch to cause the generation of the first electrical signal.

10. A unit for controlling the flow of gas, comprising:
    a gas distribution line,
    a control element for controlling the flow of gas along the gas distribution line, the control element having a shutter movable between an open state, in which the shutter permits passage of gas through the gas distribution line, and a closed state, in which the shutter prevents the passage of the gas through the gas distribution line, and
    a system for remotely detecting and signaling the open and/or closed state of the shutter, wherein the system includes:
        a pneumatic detecting device comprising a casing, a cap removably coupled to and partially disposed within one end of the casing, and a body which is movable inside the casing, the cap having a central through bore;
        an electric switch supported by the pneumatic detecting device, the electric switch extending through the central through bore of the cap and configured to generate an electrical signal representing at least one of the open and closed states, wherein the body is designed to reach at least an end conditioning position of the electric switch at which the electric switch generates the electrical signal;
means for remotely transmitting the electrical signal;
an element for controlling the control element; and
pneumatic connection means configured for connecting the pneumatic detecting device at least to the control element, wherein the pneumatic connecting means comprises:
  a first pneumatic conduit designed to connect the pneumatic detecting device to the gas distribution line, downstream of the control element, at a first operating pressure, and
  a second pneumatic conduit designed to connect the pneumatic detecting device to a drive conduit of the control element, wherein a drive pressure exists in the second pneumatic conduit, the pneumatic detecting device being of the differential type and configured to cause the body to adopt the end conditioning position of the electric switch in the passage from a condition of inequality between the pressure values of the gas in the first and second pneumatic conduits to a condition of equality between the pressure values of the gas in the first and second pneumatic conduits, or vice versa,
  wherein the drive conduit extends from the control element.

11. The unit according to claim 10, wherein the pneumatic detecting device comprises a chamber, the body is movable inside the chamber, and the body is configured to divide the chamber into two sub-chambers, one of the sub-chambers being in fluid communication with the first pneumatic conduit and the other of the sub-chambers being in fluid connection with the second pneumatic conduit or with the outside environment.

12. The unit according to claim 10, wherein the body is a piston or a deformable membrane.

13. The unit according to claim 10, wherein the electric switch is a proximity switch, and the body has a projection designed to move close to the electric switch to cause the generation of the electrical signal.

14. The unit according to claim 10, wherein the electric switch is a microswitch configured to be controlled by contact, and the body has a projection designed to contact the microswitch to cause the generation of the electrical signal.

15. A unit for controlling the flow of gas, comprising:
a gas distribution line,
a control element for controlling the flow of gas along the gas distribution line, the control element having a shutter movable between an open state, in which the shutter permits passage of gas through the gas distribution line, and a closed state, in which the shutter prevents the passage of the gas through the gas distribution line, and
a system for remotely detecting and signaling the open and/or closed state of the shutter, wherein the system includes:
  a pneumatic detecting device comprising a casing, a cap removably coupled to and partially disposed within one end of the casing, and a body which is movable inside the casing, the cap having a central through bore;
  a first electric switch supported by the pneumatic detecting device, the first electric switch extending through the central through bore of the cap and configured to generate a first electrical signal representing the open state, wherein the body is designed to reach at least an end conditioning position of the first electric switch at which the first electric switch generates the first electrical signal;
  a second electric switch supported by the pneumatic detecting device, the second electric switch configured to generate a second electrical signal representing the closed state;
means for remotely transmitting the electrical signal;
an element for controlling the control element; and
pneumatic connection means configured for connecting the pneumatic detecting device at least to the control element, wherein the pneumatic connecting means comprises:
  a pneumatic conduit designed to directly or indirectly connect the control element to the distribution line, the pneumatic conduit also being in communication with the pneumatic detecting device; the pneumatic detecting device being configured such that the body adopts the end conditioning position of the first electric switch upon reaching the open state of the shutter and the body adopts the end conditioning position of the second electric switch upon reaching the closed state of the shutter.

16. The unit according to claim 15, wherein the pneumatic detecting device comprises a chamber, the body is movable inside the chamber, and the body is configured to divide the chamber into two sub-chambers, one of the sub-chambers being in fluid communication with the pneumatic conduit and the other of the sub-chambers being in fluid connection with the outside environment.

17. A system for remotely detecting and signaling the open and/or closed state of a shutter of a control element for controlling the flow of gas along a gas distribution line, comprising:
an electric switch configured to generate an electrical signal representing at least one of the open state and the closed state of the shutter of the control element,
a pneumatic detecting device supporting the electric switch and comprising a body which is movable inside the pneumatic detecting device, the body designed to reach at least an end conditioning position of the electric switch at which the switch generates the electrical signal,
means for remotely transmitting the electrical signal,
an element for controlling the control element, and
pneumatic connection means configured for connecting the pneumatic detecting device at least to the control element,
wherein the pneumatic connecting means comprises:
  a first pneumatic conduit designed to connect the pneumatic detecting device to the distribution line, downstream of the control element, at a first operating pressure, and
  a second pneumatic conduit designed to connect the pneumatic detecting device to a drive conduit of the control element, wherein a drive pressure exists in the second conduit; the pneumatic detecting device being of the differential type and configured to cause the body to adopt the end conditioning position of the electric switch in the passage from a condition of inequality between the pressure values of the gas in the first and second pneumatic conduits to a condition of equality between the pressure values of the gas in the first and second pneumatic conduits, or vice versa, wherein the drive conduit extends from the control element.

18. The system according to claim 17, wherein the pneumatic detecting device comprises a chamber, the body is movable inside the chamber, and the body being configured to divide the chamber into two sub-chambers, one of the sub-chambers being in fluid communication with the first pneumatic conduit and the other of the sub-chambers being in fluid connection with the second pneumatic conduit or with the outside environment.

19. The system according to claim 17, wherein the body is a piston or a deformable membrane.

20. The system according to claim 17, wherein the electric switch is a proximity switch, and the body has a projection designed to move close to the proximity switch to cause the generation of the electrical signal.

21. The system according to claim 17, wherein the electric switch is a microswitch configured to be controlled by contact, and the body has a projection designed to contact the microswitch to cause the generation of the electrical signal.

* * * * *

UNITED STATES PATENT AND TRADEMARK OFFICE
CERTIFICATE OF CORRECTION

PATENT NO. : 10,774,947 B2  
APPLICATION NO. : 16/072798  
DATED : September 15, 2020  
INVENTOR(S) : Stefano Zecchi et al.

Page 1 of 1

It is certified that error appears in the above-identified patent and that said Letters Patent is hereby corrected as shown below:

On the Title Page

Item (72), Line 3, "Funo de Argelatio (IT)" should be -- Funo di Argelatio (IT) --.

Item (73), Lines 1-2, "O.M.T. OFFICINA MECCANICA TARTINI S.r.l." should be -- O.M.T. OFFICINA MECCANICA TARTARINI S.r.l. --.

In the Specification

At Column 4, Line 12, "11 b" should be -- 11b --.

At Column 6, Line 16, "mechanism 4" should be -- mechanism 104 --.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*